P. A. McCULLOUGH.
AIR CUSHION OR SPRING.
APPLICATION FILED AUG. 18, 1913.
1,199,910.
Patented Oct. 3, 1916.
2 SHEETS—SHEET 1.
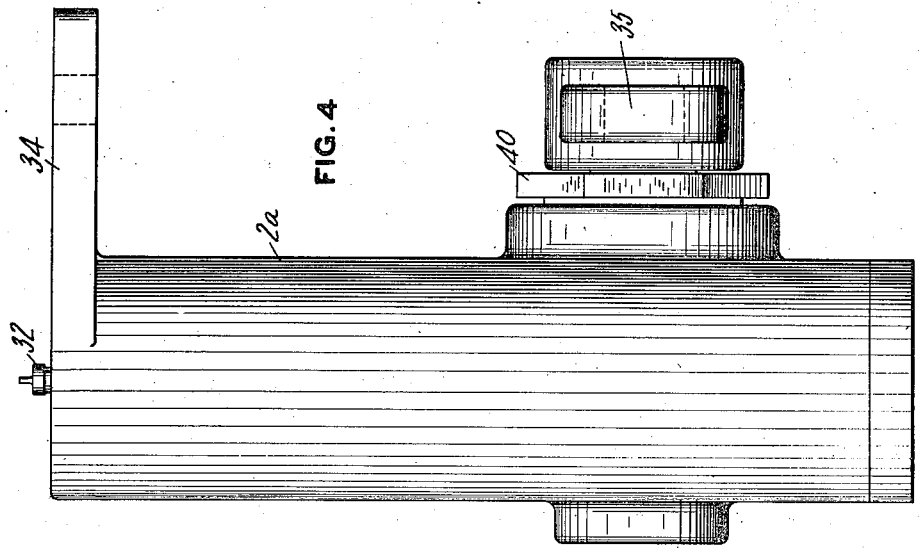
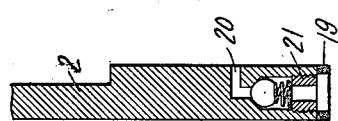
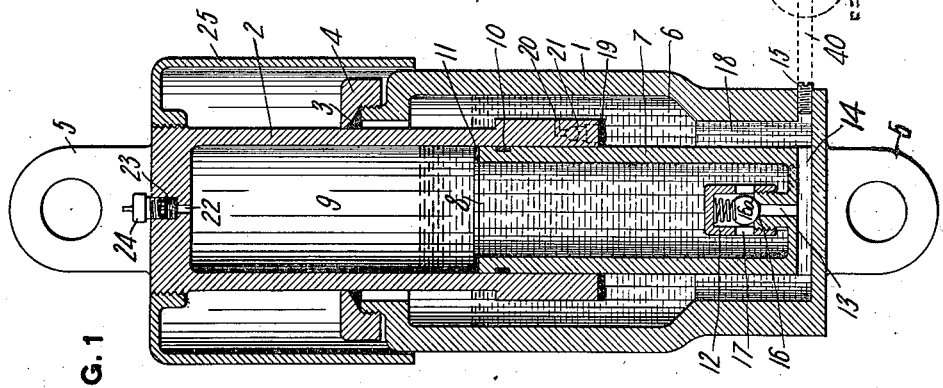
WITNESSES
INVENTOR

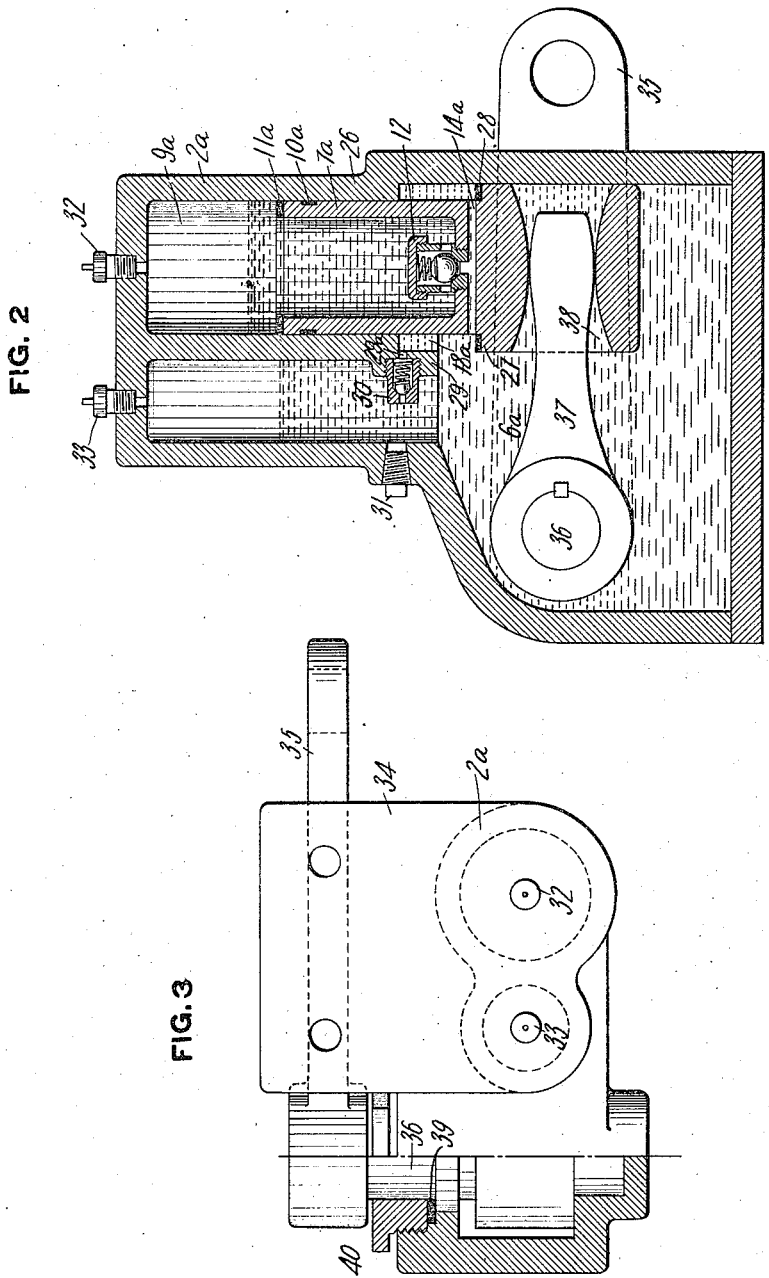

UNITED STATES PATENT OFFICE.

PETER A. McCULLOUGH, OF PITTSBURGH, PENNSYLVANIA.

AIR CUSHION OR SPRING.

1,199,910.  Specification of Letters Patent.  Patented Oct. 3, 1916.

Application filed August 18, 1913. Serial No. 785,354.

*To all whom it may concern:*

Be it known that I, PETER A. McCULLOUGH, a resident of Pittsburgh, in the county of Allegheny and State of Pennsylvania, have invented a new and useful Improvement in Air Cushions or Springs, of which the following is a specification.

This invention relates to air cushions or springs, and particularly to such as are adapted for connecting two associated members between which yielding or resilient movement is desirable.

The invention is particularly adapted for use as a cushion or spring for supporting the bodies of automobiles, wagons or the like, where the cushion or spring is subjected under traffic conditions to frequently repeated compressive movements as the automobile or wagon passes over inequalities in the road bed.

The invention is designed to take advantage of these compressive movements for maintaining the pressure of the fluid pressure medium, such as air, within the cushion, so that the cushioning effect is automatically maintained at the proper degree and is not liable to decrease due to leakage of the fluid pressure medium in the cushion.

While the invention is designed particularly for use on automobiles it will be understood that it is also applicable for use in any connection where yielding or resilient movement between two members is desirable.

The invention comprises the construction and arrangement of parts hereinafter described and claimed.

In the drawings Figure 1 represents a sectional elevation through one form of device embodying the invention; Fig. 2 is a similar view, illustrating a modified form of the invention; Fig. 3 is a plan view of the device shown in Fig. 2; Fig. 4 is a side elevation of the same; and Fig. 5 is a detail view of a valve.

The device shown in Fig. 1 of the drawings comprises two associated members, first, a main casing 1, and second, an air cylinder 2, which telescopes into the main casing and slides in a packing 3 secured thereto by a gasket 4. The members 1 and 2 are provided at their opposite ends with ears or lugs 5, preferably perforated, by means of which they may be attached to two other members between which flexible or resilient motion is desirable. The main casing 1 is hollow and is provided with an inner chamber 6, forming an outer reservoir for liquid, such as oil, glycerin or other heavy non-freezing liquid. Within said chamber the main casing is provided with a hollow piston or cylinder 7, which may be either integral with or secured to the main casing, and which is open at its upper end, as at 8. Said cylinder fits and slides within a chamber or space 9 in the air cylinder 2, and is provided with a side packing 10 to form a tight joint between the cylinders 2 and 7. End packings 11 may also be provided at the ends of the two cylinders to further decrease the liability of leakage of liquid from the chamber within the two cylinders.

Cylinder 7 at its lower end is provided with a check valve 12 of any suitable type, said valve, in the form shown, communicating with a passage 13 leading to a transverse passage 14 communicating with the chamber 6 within the hollow casing 1. The transverse passage 14 is preferably formed by boring through from one side of the main casing, and its outer end is closed or sealed by a plug 15. The valve 12 is provided with a valve seat 16 at the upper end of the passage 13, upon which seats a ball valve member 16$^a$, so arranged as to permit the passage of liquid from the chamber 6 by way of passages 14 and 13 and the side ports 17 of the valve cap into the chamber 9 within the cylinders 7 and 2, but designed to prevent any flow of liquid in the opposite direction.

The lower end of the chamber 6, is restricted, as at 18, to form an annular pump cylinder. The lower annular end of the cylinder 2 is formed of such size and thickness as to fit tightly within the pump cylinder 18, and is preferably provided at its lower end with a packing 19 to increase the efficiency in operation of the pump. Preferably, a leak port 20 more or less restricted, is provided in the lower end portion of the cylinder 2 which forms the pump piston, so that restricted communication will be afforded between opposite sides of said piston. If desired, a check valve 21, of any suitable type may be provided in said leak port, said valve being so arranged that liquid may flow from the upper side to the lower side of said piston on the backward stroke thereof, but not in the reverse direction.

The upper end of the air cylinder 2 is hermetically sealed, but is preferably provided with a port 22 controlled by a spring-pressed valve 23, said valve being pressed outwardly against its seat. This valve is provided to enable air or other fluid pressure medium to be pumped into the space or chamber within the air cylinder, but prevents leakage of air therefrom. If desired, the valve may be provided with a suitable cap or cover 24 to decrease the liability of leakage of the air.

In use of the device the plug 15 is removed and a quantity of incompressible liquid, such as oil, glycerin or the like, is pumped into the device. The quantity of liquid is measured so that it will normally stand in the chamber 6 within the casing 1 at about the level shown, that is, somewhat above the lower end of the air cylinder 2. The liquid also fills the space or chamber 9 within the air cylinder 2 and the lower cylinder 7 to a level somewhat above the upper end of the cylinder 7, that is, so that it covers the packing between the two cylinders 2 and 7. Air or other compressible fluid pressure medium is then pumped through the valve 22 into the space 9 above the oil therein, the pressure of the fluid medium being adjusted in accordance with the amount of tension which is suitable in connection with the special use for which the cushion is designed. It will, of course, be understood that the cushion is secured by means of the lugs or ears 5 between the two members between which flexible movement is desired, such as between the body and running gear of an automobile. The weight of the body is now imposed upon the upper member 2 and the downward telescoping movement of this member with relation to the lower member compresses the air above the oil within member 2, so that the air serves as a yielding cushion. As the automobile passes over rough or uneven spots in the roadbed the upper and lower members of the spring vibrate or move telescopically with relation to each other, so that there is a sliding movement between the two cylinders 2 and 7.

In practice it is impossible to prevent slight leakage of the oil through the joint or past the packing between these two members, so that there is a constant and gradual passage of the oil from the chamber 9 through the joint between the two cylinders and into the chamber or space 6 around the cylinder 7 and within the main casing 1. As the level of oil in the chamber 9 lowers the upper member 2 gradually sinks with reference to the lower member. Also, the level of oil in the chamber 6 rises. Finally a point is reached where upon compressive movement of the upper member 2 with reference to the lower member 7 the pump piston formed by the lower end of the member 2 enters the pump cylinder 18. When this occurs the member 2 acts as a pump piston and on its downward movements forces the oil in the pump cylinder 18 downwardly and through the passages 14 and 13 and thence through the valve 12 into the space or chamber 9 within the cylinders 2 and 7. Every time the members 2 and 7 move longitudinally with reference to each other, under the circumstances referred to, the upper member 2 acts as a piston to transfer a charge of oil from the chamber 6 to the chamber 9. The piston strokes are consequently repeated until finally sufficient oil has been transferred from chamber 6 to chamber 9 to restore the level of oil in the latter chamber to its former position, at the same time increasing the pressure of the air within said chamber to its former amount.

In practice the upper or air cylinder 2 is preferably provided with a cup-shaped outer casing or cover 25, the lower edge of which projects downwardly beyond the upper end of the main casing 1 and surrounds the same. This outer casing 25 covers and protects the sliding joint between the members 1 and 2 and prevents access of dust and dirt to the device. This outer casing, however, is not essential and may obviously be omitted.

Figs. 2, 3 and 4 illustrate a modified form of the invention in which the upper or air cylinder 2ª is part of a main casing 26 which completely incloses and protects the lower cylinder 7ª. The latter telescopes within the upper cylinder 2ª and is provided with packings 10ª and 11ª to secure a tight joint. Cylinder 7ª is hollow and at its lower end is provided with a check valve 12ª, of the same form and construction as valve 12, Fig. 1, and which communicates with a cross passage 14ª opening at its opposite ends through the side walls of the lower member and communicating with the space or chamber 6ª within the casing 26. The wall of casing 26 is hollowed out or cut away to provide an annular pump cylinder 18ª which surrounds the lower piston 7ª and coöperates with a piston formed by an enlargement or head 27 on the lower end of the cylinder 7ª and which is provided with a packing 28 to increase the efficiency of the pump. The inner portion of the upper cylinder 2ª is formed by a wall 29ª extending across the space 6ª within the casing 26, and this wall at its lower end is provided with a passage 29 controlled by a suitable check valve 30 communicating at its inner end with the pump cylinder 18ª and at its outer end with the space 6ª within the casing 26. The check valve is so arranged as to permit liquid to flow from the chamber 6ª into the pump cylinder but not in the reverse direction.

For filling the casing with oil one wall thereof is provided with a filling opening 13c closed by a suitable plug 31, and for supplying air to the space in the casing above the oil level the casing is provided with air supply valves 32 and 33, one communicating with the space 9ª within the two telescoping cylinders and the other with the space above the oil in the outer chamber 6ª.

The casing 26 is provided with suitable flanges or shelves 34 by means of which it may be bolted or secured to one of the two members between which flexible or resilient movement is desired. The other of said members is suitably secured to the outer end of an operating lever 35 which is keyed on a shaft 36 journaled in the casing and carrying a crank or lever 37 within said casing, the outer end of which projects into an opening 38 in the enlarged lower end of the cylinder 7ª. Suitable packings 39, held in place by a nut 40 prevent leakage of oil from the casing around the shaft 36.

The device just described is in some respects a reversal of the form shown in Fig. 1, but the principle of operation thereof is the same.

In use of the device the casing 26 is filled with oil to about the level shown, the oil being also allowed to flow through the check valve 12ª into the space 9ª within the cylinders 2ª and 7ª. Air is then pumped in through the valves 32 and 33 to produce the pressure best adapted for the intended use of the air cushion. The cushion being attached to the two members between which yielding movement is desirable, it will be clear that compressive movement between said members has the effect of swinging the levers 35 and 37 counter-clockwise in Fig. 2, thereby forcing the lower cylinder 7ª upwardly. Such movement is resisted by the air in the chamber 9ª, which consequently acts as a cushion between the two members. In practice the oil in chamber 9ª gradually leaks out past the packings 10ª and 11ª and into the chamber 6ª within the casing 26, although this leakage is to some extent resisted by the compressed air above the oil in chamber 6ª. As the oil leaks out from the chamber 9ª cylinder 7ª gradually rises until finally a position is reached where the enlarged head or piston 27 on the lower end of cylinder 7ª enters the pump cylinder 18ª. This is in communication with the chamber 6ª and is filled with oil. When another compressive movement between the two members occurs the head 27 and annular cylinder 18ª act as a pump to force oil through the passage 14ª and check valve 12ª into the chamber 9ª within the pistons. On the backward movement of the pump piston oil is drawn in to the chamber 18ª through the check valve 30 and the next compressive movement of the pump piston forces another charge of oil into the chamber 9ª. The pumping action continues until the pressure of air in the chamber 9ª is restored to its original amount.

The arrangement shown in Fig. 2 also acts under certain circumstances to pump oil into chamber 9ª on the backward or separating movement of the two cylinders. As the cylinders separate the head 27 of the lower cylinder displaces the oil in chamber 6ª and compresses the air above the oil therein. If sufficient oil has leaked from chamber 9ª into chamber 6ª the air pressure in chamber 6ª may consequently be raised on the backward stroke above that in chamber 9ª, and oil will thereupon flow from chamber 6ª through passage 14ª and valve 12ª into chamber 9ª.

In practice, the constructions described act somewhat after the manner of a governor. That is to say, while there may be leakage of oil from the chamber within the two pistons to the outer chamber surrounding the same, the compressive or telescoping movement of the two cylinders with reference to each other bring the pump parts automatically into action and the pump automatically keeps pace with the leakage of oil so that the pressure of the cushioning air is maintained practically constant. The constructions described are comparatively simple and prevent loss or waste of oil and automatically maintain the proper cushioning effect.

Under some circumstances, as when an automobile equipped with the device stands idle for a long period of time, say several months, it may happen that there is considerable leakage of oil from the inner to the outer chamber, so that the device practically runs down and the piston on one member quietly settles into the pump cylinder on the other. When this occurs with the device shown in Fig. 1, the plug 15 is removed and a conduit 40 communicating with a suitable suction pump 41 is attached in its place. The pump is then started and the oil contained in the chamber 6 is drawn out through the check valve 21 and into a suitable reservoir 42. The pump is then reversed and the oil pumped back through the conduit 40 and forced through the valve 12 into the chamber 9 until the oil reaches the proper level. Plug 15 is then replaced and air forced into the chamber 9 through the valve 23, thereby restoring the device to normal condition and giving it the proper cushioning effect.

What I claim is:—

1. The combination of two telescoping members having an inner chamber, liquid and gaseous fluids in said chamber, the lower of said members entering the upper thereof, and a pump for pumping liquid into said chamber, the upper of said members forming a piston for said pump and the cylinder for said pump being located below the normal downward limit of travel of said piston, whereby said pump is normally ineffective but becomes effective when said members approach each other beyond the normal amount.

2. The combination of two telescoping members having an inner chamber, liquid and gaseous fluids in said chamber, the lower of said members entering the upper thereof, a reservoir arranged to receive liquid which leaks through the joint between said members, a pump for returning the liquid to said chamber, the upper of said members forming the piston for said pump, and a cylinder for said pump comprising a portion of said reservoir located below the normal downward limit of travel of said piston, whereby said pump is normally ineffective but becomes effective when said members approach each other beyond the normal amount.

3. The combination of two telescoping members having an inner chamber, liquid and gaseous fluids in said chamber, a reservoir for liquid having a restricted portion, and a pump piston normally reciprocating in the larger part of said reservoir, but arranged when the members approach each other beyond the normal amount to enter the restricted portion of said reservoir and pump liquid into said chamber.

4. The combination of two telescoping members having an inner chamber, liquid and gaseous fluids in said chamber, and a reservoir lying outside of and below the sliding joint between said members, said reservoir having a restricted portion, and one of said members having a part normally reciprocating in the larger part of said reservoir, but arranged when the members approach each other beyond the normal amount to enter the restricted portion of said reservoir and pump liquid into said chamber.

5. The combination of two telescoping members having an inner chamber, liquid and gaseous fluids in said chamber, and a casing arranged to form a reservoir having an annular portion lying outside of and below the sliding joint between said members, said reservoir having a restricted portion, one of said members having a part arranged to work normally in the larger part of said reservoir, but arranged when said members approach each other beyond the normal amount to enter the restricted portion of said reservoir and pump liquid into said chamber.

6. The combination of two telescoping members having an inner chamber, liquid and gaseous fluids in said chamber, and a casing arranged to form a reservoir having an annular portion lying outside of and below the sliding joint between said members, said reservoir having a restricted portion, the upper member surrounding the lower member and normally working in the larger part of said reservoir, but arranged when said members approach each other beyond the normal amount to enter the restricted portion of said reservoir and pump liquid into said chamber.

7. The combination of two telescoping members having an inner chamber, liquid and gaseous fluids in said chamber, and a casing arranged to form a reservoir having an annular portion lying outside of and below the sliding joint between said members, the wall of said reservoir extending above said sliding joint, said reservoir having a restricted portion, one of said members having a part arranged to work normally in the larger part of said reservoir, but arranged when said members approach each other beyond the normal amount to enter the restricted portion of said reservoir and pump liquid into said chamber.

8. The combination of two telescoping members having an inner chamber, liquid and gaseous fluids in said chamber, and a casing arranged to form a reservoir having an annular portion lying outside of and below the sliding joint between said members, the wall of said reservoir extending above said sliding joint, said reservoir having a restricted portion, the upper member surrounding the lower member and normally working in the larger part of said reservoir, but arranged when said members approach each other beyond the normal amount to enter the restricted portion of said reservoir and pump liquid into said chamber.

9. The combination of two telescoping members having an inner chamber, liquid and gaseous fluids in said chamber, the lower of said members entering the upper thereof, and a reservoir lying outside of and below the sliding joint between said members, a portion of said reservoir serving as a pump cylinder, one of said members having a normally inoperative part coöperating with said cylinder and arranged when said members approach each other beyond the normal amount to pump liquid from said reservoir into said chamber.

In testimony whereof, I have hereunto set my hand.

PETER A. McCULLOUGH.

Witnesses:
 ELBERT L. HYDE,
 GLENN H. LERESCHE.